(12) United States Patent
Fu et al.

(10) Patent No.: US 11,399,369 B2
(45) Date of Patent: Jul. 26, 2022

(54) TRANSMISSION RESOURCE ALLOCATION METHOD AND APPARATUS

(71) Applicant: HUAWEI TECHNOLOGIES CO., LTD., Guangdong (CN)

(72) Inventors: Yaxing Fu, Shanghai (CN); Min Zhang, Chengdu (CN); Feixiang Yu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 132 days.

(21) Appl. No.: 16/817,192

(22) Filed: Mar. 12, 2020

(65) Prior Publication Data
US 2020/0214009 A1    Jul. 2, 2020

Related U.S. Application Data

(63) Continuation of application No. PCT/CN2017/101875, filed on Sep. 15, 2017.

(51) Int. Cl.
*H04W 4/00* (2018.01)
*H04W 72/04* (2009.01)
*H04L 1/18* (2006.01)

(52) U.S. Cl.
CPC ....... *H04W 72/0446* (2013.01); *H04L 1/1812* (2013.01); *H04W 72/0413* (2013.01)

(58) Field of Classification Search
CPC .......... H04W 72/0413; H04W 72/0446; H04L 5/0053; H04L 5/0055
See application file for complete search history.

(56) References Cited

U.S. PATENT DOCUMENTS

2013/0034073 A1 * 2/2013 Aiba ............... H04L 1/1887
370/329
2014/0301338 A1 * 10/2014 Zhong ............ H04L 5/0055
370/329
(Continued)

FOREIGN PATENT DOCUMENTS

CN    101841862 A    9/2010
CN    103095395 A    5/2013
(Continued)

OTHER PUBLICATIONS

Huawei et al.,"Short PUCCH for UCI of up to 2 bits",3GPP TSG RAN WG1 Meeting AH_NR#3,R1-1715399,Nagoya, Japan, Sep. 18-21, 2017, total 17 pages.
(Continued)

*Primary Examiner* — Bo Hui A Zhu
(74) *Attorney, Agent, or Firm* — Womble Bond Dickinson (US) LLP

(57) ABSTRACT

This application relates to the field of communication technologies, and provides a transmission resource allocation method and an apparatus, to flexibly control a quantity of reserved transmission resources. This method includes: obtaining, by a network-side device in each period, quantity information of user equipments (UEs) scheduled by the network-side device in a current period; and allocating, by the network-side device based on the quantity information, M transmission resources used to transmit HARQ acknowledgement information, where M represents a numeric value corresponding to a range in which the quantity information is located.

15 Claims, 3 Drawing Sheets

---

A network-side device obtains, in each period, quantity information of UEs scheduled by the network-side device in a current period — 301

The network-side device allocates, based on the quantity information, M transmission resources used to transmit HARQ acknowledgement information — 302

(56) References Cited

U.S. PATENT DOCUMENTS

| | | | |
|---|---|---|---|
| 2015/0163797 A1 | 6/2015 | Fu et al. | |
| 2016/0366681 A1 | 12/2016 | Dinan | |
| 2017/0013641 A1* | 1/2017 | Patel | H04L 1/0027 |
| 2017/0245269 A1* | 8/2017 | Ezaki | H04W 72/0446 |

FOREIGN PATENT DOCUMENTS

| | | |
|---|---|---|
| CN | 103684705 A | 3/2014 |
| CN | 103716887 A | 4/2014 |
| CN | 106102169 A | 11/2016 |
| CN | 106102172 A | 11/2016 |
| WO | 2014000201 A1 | 1/2014 |
| WO | 2017036550 A1 | 3/2017 |
| WO | 2017135887 A1 | 8/2017 |

OTHER PUBLICATIONS

InterDigital Inc.,"Evaluation of Long-PUCCH for moderate UCI payload with multiplexing capacity",3GPP TSG RAN WG1 Meeting NR#3,R1-1716479,Nagoya, Japan, Sep. 18-21, 2017, total 7 pages.

Huawei, HiSilicon, Short PUCCH for UCI of up to 2 bits . 3GPP TSG RAN WG1 Meeting AH_NR#3, Nagoya, Japan, Sep. 18-21, 2017, R1-1715399, 17 pages.

* cited by examiner

TRANSMISSION RESOURCE ALLOCATION METHOD AND APPARATUS

CROSS-REFERENCE TO RELATED APPLICATIONS

This application is a continuation of International Application No. PCT/CN2017/101875, filed on Sep. 15, 2017, the disclosure of which is hereby incorporated by reference in its entirety

TECHNICAL FIELD

This application relates to the field of communications technologies, and in particular, to a transmission resource allocation method and an apparatus.

BACKGROUND

In a long term evolution (LTE) system, after a base station performs, through a secondary cell (SCell) of carrier aggregation (CA) user equipment (UE), downlink hybrid automatic repeat request (HARQ) scheduling on the CA UE, the CA UE needs to feed back HARQ-ACK information to the base station through a physical uplink control channel (PUCCH) of a primary cell (PCell). Generally, a larger quantity of code channel resources provided by a network side for feeding back the HARQ-ACK information indicates a larger quantity of CA UEs allowed to feed back the HARQ-ACK information simultaneously in a cell and a higher downlink throughput rate of the cell.

Currently, in a control policy for code channel resources used to feed back HARQ-ACK information, a base station reserves a fixed quantity of code channel resources to receive the HARQ-ACK information sent by CA UE. However, when a quantity of the CA UEs is relatively small, an excessive quantity of reserved code channel resources may cause waste of uplink resources. When the quantity of the CA UEs is relatively large, a relatively small quantity of reserved code channel resources may cause a relatively low downlink throughput rate of a cell. That is, the current control manner in which a fixed quantity of code channel resources are reserved is not flexible enough.

SUMMARY

This application provides a transmission resource allocation method and an apparatus, so that a quantity of reserved transmission resources can be flexibly controlled.

According to a first aspect, this application provides a transmission resource allocation method, including: obtaining, by a network-side device in each period, quantity information of user equipments (UEs) scheduled by the network-side device in a current period; and allocating, by the network-side device based on the quantity information, M transmission resources used to transmit hybrid automatic repeat request (HARQ) acknowledgement information, where M represents a numeric value corresponding to a range in which the quantity information is located.

By using the transmission resource allocation method provided in this application, the network-side device can periodically adjust a quantity of to-be-allocated transmission resources based on the quantity information of the scheduled UEs, to flexibly control a quantity of reserved transmission resources used to receive the HARQ acknowledgement information, thereby avoiding a problem of uplink resource waste caused by reserving an excessive quantity of transmission resources when a quantity of scheduled UEs is relatively small, and a problem of a low downlink throughput rate of a cell caused by reserving a relatively small quantity of transmission resources when a quantity of UEs is relatively large.

In one embodiment, the method further includes: receiving, by the network-side device, the HARQ acknowledgement information by using the M transmission resources in a next period relative to the current period.

According to a second aspect, this application provides a network-side device, including: an obtaining unit, configured to obtain, in each period, quantity information of user equipments (UEs) scheduled by the network-side device in a current period; and an allocation unit, configured to allocate, based on the quantity information obtained by the obtaining unit, M transmission resources used to transmit HARQ acknowledgement information, where M represents a numeric value corresponding to a range in which the quantity information is located.

In one embodiment, the network-side device further includes a receiving unit, and the receiving unit is configured to receive, in a next period relative to the current period, the HARQ acknowledgement information by using the M transmission resources allocated by the allocation unit.

For a technical effect of the network-side device provided in this application, refer to technical effects of the first aspect or the embodiments of the first aspect, and details are not described herein again.

With reference to the first aspect and the second aspect, in one embodiment, the quantity information is a total quantity of the UEs scheduled in the current period.

In one embodiment, the quantity information is an average quantity of UEs scheduled in all transmission time intervals (TTIs) in the current period.

In one embodiment, the transmission resource is a code channel resource for a physical uplink control channel (PUCCH) format (format 1b) channel selection (CS) manner, or the transmission resource is a resource block (RB) for PUCCH format 3.

According to a third aspect, this application further provides a network-side device, including: a processor, a memory, a bus and a transceiver. The memory is configured to store a computer executable instruction, and the processor is connected to the memory and the transceiver by using the bus. When the network-side device runs, the processor executes the computer executable instruction stored in the memory, to implement the transmission resource allocation method according to the first aspect and the embodiments of the first aspect.

For a technical effect of the network-side device provided in this application, refer to technical effects of the first aspect or the embodiments of the first aspect, and details are not described herein again.

According to a fourth aspect, this application further provides a computer storage medium. The computer storage medium stores an instruction. When run on a computer, the instruction causes the computer to perform the method according to the first aspect.

According to a fifth aspect, this application further provides a computer program product including an instruction. When run on a computer, the computer program product causes the computer to perform the method according to the first aspect.

DESCRIPTION OF EMBODIMENTS

First, the character "/" in this specification generally indicates an "or" relationship between the associated objects. The term "and/or" in this specification describes only an association relationship for associated objects and represents that three relationships may exist. For example, A and/or B may represent the following three cases: Only A exists, both A and B exist, and only B exists.

When the embodiments of the present application mention an ordinal such as "first", "second", "third" or "fourth", the ordinal should be understood as only serving a purpose of distinguishing, unless the ordinal definitely expresses a meaning of sequence based on context.

Secondly, the transmission resource allocation method provided in this application may be applicable to an LTE system, an LTE advanced (LTE-A) system, or another wireless communications system that uses various radio access technologies, for example, a system that uses an access technology such as code division multiple access, frequency division multiple access, time division multiple access, orthogonal frequency division multiple access, or CA. In addition, the transmission resource allocation method may be applicable to a subsequent evolved system, such as a fifth-generation 5G system, using the LTE system.

Figure 1:
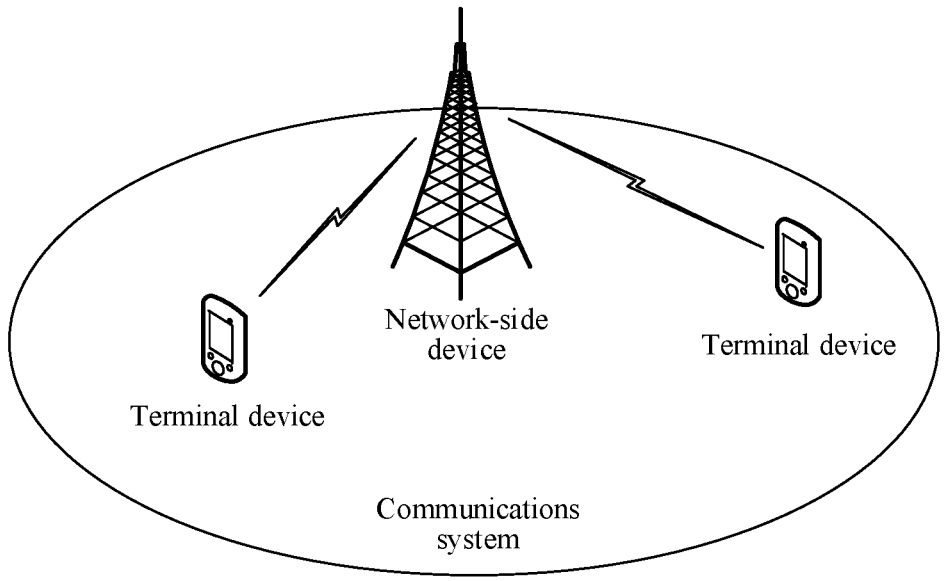
FIG. 1 is a schematic diagram of a communications system according to this application.

As shown in FIG. 1, the transmission resource allocation method provided in this application may be applicable to a communications system including a network-side device and a plurality of terminal devices. The terminal devices may include a handheld device, an in-vehicle device, a wearable device, or a computing device that provides a radio communication function; another processing device connected to a wireless modem; a communications node on a household appliance, medical equipment, an industrial device, an agricultural device, aeronautical equipment, or the like; or user equipment (UE) in various forms, a mobile station (MS), a terminal, terminal equipment, and the like.

The network-side device in this application may be a device having a base station (BS) function, including various forms of macro base stations, micro base stations, relay sites, controllers, access points, and the like. In systems using different radio access technologies, names of devices having a base station function may be different. For example, in an LTE network, the device is referred to as an evolved NodeB (eNB or eNodeB). In a third-generation 3G network, the device is referred to as a NodeB, or a communications node that is applied to the fifth-generation communications system or used for D2D communication, or the like, or may be another similar network-side device. Alternatively, the network-side device may be a transmission and reception point (TRP), a structure of the TRP may be a structure of a base station, or may be a structure including a remote radio unit (RRU), a building baseband unit (BBU) and an antenna feeder system, or may be a structure only including a radio frequency and antenna system.

Figure 2:
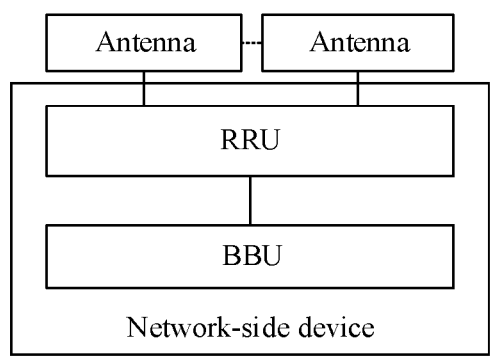
FIG. 2 is a schematic structural diagram 1 of a network-side device according to this application.

Schematically, FIG. 2 is a schematic structural diagram of a network-side device according to this application, and the network-side device may include an RRU, a BBU and an antenna feeder system.

The RRU includes a digital intermediate frequency module, a transceiver module, a power amplification module, and a filtering module. The digital intermediate frequency module is configured to: perform modulation and demodulation for optical transmission, perform digital up-down frequency conversion, perform A/D conversion, and the like. The transceiver module completes conversion from an intermediate frequency signal to a radio frequency signal, and transmits the radio frequency signal by using an antenna port through the power amplification module and the filtering module. The BBU is configured to: implement functions such as channel encoding and decoding, modulation and demodulation of a baseband signal, and protocol processing, provide an interface function for an upper-layer network element, and implement a processing procedure of a physical layer core technology, such as CDMA in 3G and OFDM/MIMO processing in LTE. The antenna feeder system mainly includes an antenna, and may further include a coupler, a demultiplexer, and the like, configured to transmit data between the RRU and another network element such as a terminal device.

Figure 3A:
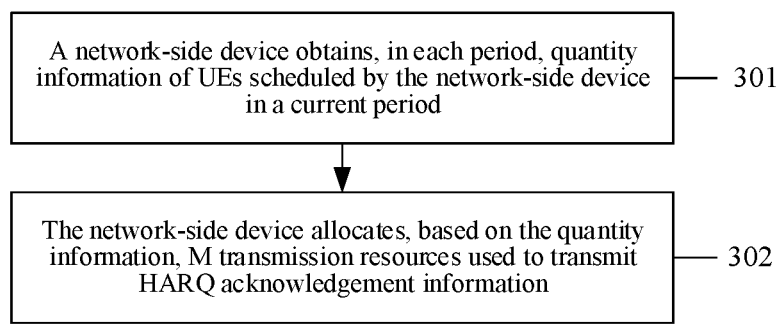
FIG. 3A is a flowchart of an embodiment of a transmission resource allocation method according to this application.

Based on the communications system shown in FIG. 1, FIG. 3A is a flowchart of an embodiment of a transmission resource allocation method according to this application. The method may include the following operations.

Operation 301: A network-side device obtains, in each period, quantity information of UEs scheduled by the network-side device in a current period.

In this application, the network-side device may periodically obtain the quantity information of the scheduled UEs to adjust a quantity of transmission resources that need to be reserved.

In an example, the quantity information may be a total quantity of the UEs scheduled by the network-side device in the current period. For example, assuming that a period is 5 seconds (s), a total quantity of UEs scheduled in the 5 s is counted once in each period as the quantity information.

In one embodiment, the quantity information may further be an average quantity of the UEs scheduled by the network-side device in all TTIs in the current period. For example, in each period (5 s), the network-side device may count a quantity of UEs scheduled in each transmission TTI in the 5 s, then calculate an average quantity of UEs scheduled in all TTIs in the 5 s, and use the average quantity as the quantity information.

The UEs scheduled by the network-side device may be UEs on which the network-side device performs downlink HARQ scheduling.

Operation 302: The network-side device allocates, based on the quantity information, M transmission resources used to transmit HARQ acknowledgement information.

M represents a numeric value corresponding to a range in which the quantity information is located. That is, in this application, after obtaining the quantity information of the UEs scheduled in the current period, the network-side device may determine, based on the range in which the quantity information is located, the quantity M of the transmission resources that need to be reserved for transmission of the HARQ acknowledgement information, and allocate the M transmission resources.

In an example, the transmission resource may be a code channel resource for a PUCCH format 1b channel selection (CS) manner, or may be a resource block (RB) for PUCCH format 3.

Schematically, 5 s is used as one period, and the total quantity of the UEs scheduled by the network-side device in each period is used as the quantity information. It is assumed that a preset allocation rule in the network-side device is: When the total quantity of UEs scheduled by the network-side device is in a range [0, 200], 20 code channel resources are allocated; when the total quantity of UEs scheduled by the network-side device is in a range [201, 400], 30 code channel resources are allocated; and when the total quantity of UEs scheduled by the network-side device is in a range [401, +∞), 60 code channel resources are allocated. In this way, if determining that the total quantity of UEs scheduled in the current period is 120, the network-side device determines, based on the foregoing allocation rule, to allocate 20 code channel resources, so that the UEs can subsequently feed back the HARQ acknowledgement information.

Alternatively, a preset allocation rule in the network-side device is: When the total quantity of the UEs scheduled by the network-side device is in a range [0, 200], 1 RB is allocated; when the total quantity of the UEs scheduled by the network-side device is in a range [201, 400], 2 RBs are allocated; and when the total quantity of the UEs scheduled by the network-side device is in a range [401, +∞), 3 RBs are allocated. In this way, if determining that the total quantity of UEs scheduled in the current period is 120, the network-side device determines, based on the foregoing allocation rule, to allocate 1 RB, so that the UEs can subsequently feed back the HARQ acknowledgement information.

In one embodiment, when the average quantity of the UEs scheduled by the network-side device in all TTIs in the current period is used as the quantity information, it is assumed that a preset allocation rule in the network-side device is: When the average quantity of the UEs scheduled by the network-side device in the TTIs is in a range [0, 10], 10 code channel resources are allocated; when the average quantity of the UEs scheduled by the network-side device in the TTIs is in a range [11, 20], 20 code channel resources are allocated; and when the average quantity of the UEs scheduled by the network-side device in the TTIs is in a range [21, +∞), 30 code channel resources are allocated. In this way, if determining that the average quantity of the UEs scheduled in all the TTIs in the current period is 12, the network-side device determines, based on the foregoing allocation rule, to allocate 20 code channel resources, so that the UEs can subsequently feed back the HARQ acknowledgement information.

Alternatively, a preset allocation rule in the network-side device is: When the average quantity of the UEs scheduled by the network-side device in the TTIs is in a range [0, 5], 1 RB is allocated; when the average quantity of the UEs scheduled by the network-side device in the TTIs is in a range [5, 10], 2 RBs are allocated; and when the average quantity of the UEs scheduled by the network-side device in the TTIs is in a range [10, 15], 3 RBs are allocated. In this way, if determining that the average quantity of UEs scheduled in all the TTIs in the current period is 2, the network-side device determines, based on the foregoing allocation rule, to allocate 1 RB, so that the UEs can subsequently feed back the HARQ acknowledgement information.

It can be understood that in the preset allocation rule in the network-side device, range division and a quantity of corresponding code channel resources or RBs may be set based on a requirement in an actual network. This is not limited in this application.

Figure 3B:
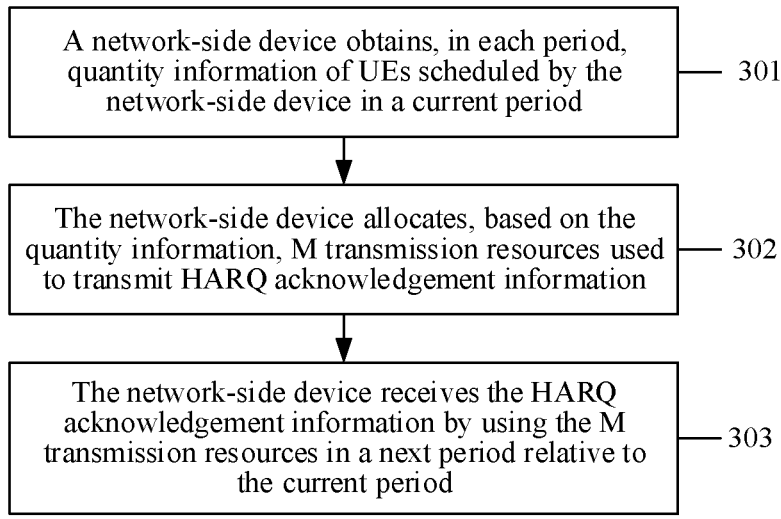
FIG. 3B is a flowchart of another embodiment of a transmission resource allocation method according to this application.

In an example, after allocating the M transmission resources, the network-side device may receive, on the M transmission resources, the HARQ acknowledgement information fed back subsequently by the UEs. That is, based on FIG. 3A and as shown in FIG. 3B, after operation 302, the method may further include:

Operation 303: The network-side device receives the HARQ acknowledgement information by using the M transmission resources in a next period relative to the current period.

In this application, after adjusting a quantity of the reserved transmission resources based on the quantity information of the UEs scheduled in the current period, the network-side device may receive, in the next period by using the M transmission resources, the HARQ acknowledgement information fed back by the UEs. The HARQ acknowledgement information may be HARQ-ACK information.

From the foregoing embodiment, it can be learned that by using the transmission resource allocation method provided in this application, the network-side device can periodically adjust the quantity of to-be-allocated transmission resources based on the quantity information of the scheduled UEs, to flexibly control the quantity of the reserved transmission resources used to receive the HARQ acknowledgement information, thereby avoiding a problem of uplink resource waste caused by reserving an excessive quantity of transmission resources when a quantity of scheduled UEs is relatively small, and a problem of a low downlink throughput rate of a cell caused by reserving a relatively small quantity of transmission resources when a quantity of UEs is relatively large.

The foregoing describes the solutions provided in this application mainly from the perspective of interaction between network elements. It may be understood that, to implement the foregoing functions, the network elements, such as the network-side device, include a corresponding hardware structure and/or software module for performing each of the functions. A person skilled in the art should easily be aware that, in combination with the examples described in the embodiments disclosed in this specification, units, and algorithms operations may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, function modules of the network-side device may be divided based on the foregoing method examples. For example, each function module may be divided based on each function, or two or more functions may be integrated into one processing module. The integrated module may be implemented in a form of hardware, or may be implemented in a form of a software function module. It should be noted that, in this application, module division is exemplary, and is merely a logical function division. In actual implementation, another division manner may be used.

Figure 4A:
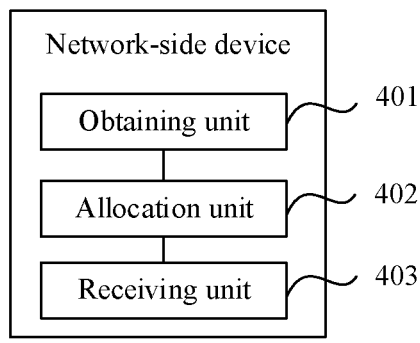
FIG. 4A is a schematic structural diagram 2 of a network-side device according to this application.

When various function modules are divided based on the corresponding functions, FIG. 4A is a possible schematic structural diagram of the network-side device in the foregoing embodiments. The network-side device includes an obtaining unit 401, an allocation unit 402, and a receiving unit 403. The obtaining unit 401 is configured to support the network-side device in performing operation 301 in FIG. 3A and operation 301 in FIG. 3B; the allocation unit 402 is configured to support the network-side device in performing operation 302 in FIG. 3A and operation 302 in FIG. 3B; and the receiving unit 403 is configured to support the network-side device in performing operation 303 in FIG. 3B. For the functional descriptions of the corresponding function modules, refer to all related content of the operations in the foregoing method embodiments, and details are not described herein again.

Figure 4B:
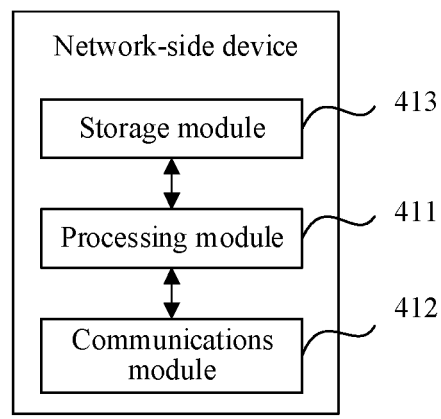
FIG. 4B is a schematic structural diagram 3 of a network-side device according to this application.

When an integrated unit is used, FIG. 4B is a possible schematic structural diagram of the network-side device in the foregoing embodiments. The network-side device includes a processing module 411 and a communications module 412. The processing module 411 is configured to control and manage actions of the network-side device. For example, the processing module 411 is configured to support the network-side device in performing operations 301 and 302 in FIG. 3A, operations 301 to 303 in FIG. 3B, and/or another process in the technology described in this specification. The communications module 412 is configured to support communication between the network-side device and another network entity, for example, communication between the network-side device and the function module or the network entity that is shown in FIG. 1. The network-side device may further include a storage module 413, configured to store program code and data of the network-side device.

The processing module 411 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 412 may be a transceiver, a transceiver circuit, a communications interface, or the like. The storage module 413 may be a memory.

Figure 4C:
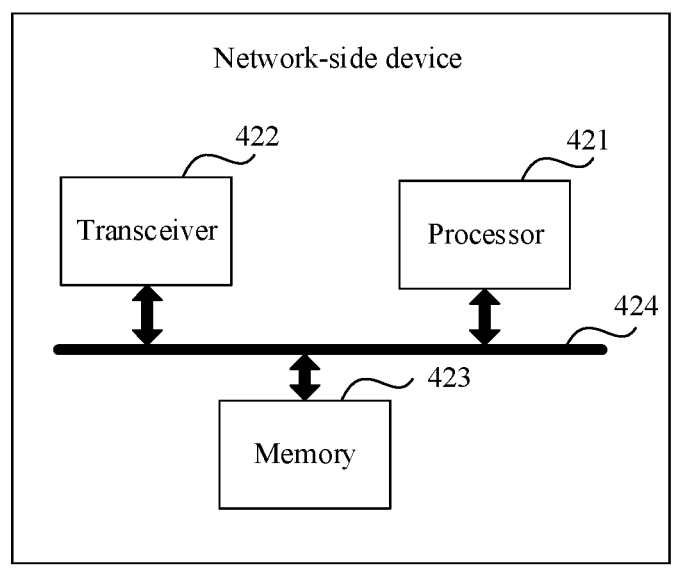
FIG. 4C is a schematic structural diagram 4 of a network-side device according to this application.

When the processing module 411 is a processor, the communications module 412 is a transceiver, and when the storage module 413 is a memory, the network-side device in this application may be the network-side device shown in FIG. 4C.

Referring to FIG. 4C, the network-side device includes a processor 421, a transceiver 422, a memory 423, and a bus 424. The transceiver 422, the processor 421, and the memory 423 are connected to each other by using the bus 424. The bus 424 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4C, but this does not mean that there is only one bus or only one type of bus.

In one embodiment, the present application further provides a computer storage medium. The computer storage medium may store a program. When executed, the program may include some or all of the operations in the embodiments of the transmission resource allocation method provided in the present application. The storage medium may be a magnetic disk, an optical disc, a read-only memory (ROM for short), a random access memory (RAM for short), or the like.

This application further provides a computer program product including an instruction. When run on a computer, the computer program product enables the computer to perform some or all of the operations in the embodiments of the transmission resource allocation method provided in this application.

A person skilled in the art may clearly understand that, the technologies in the embodiments of the present application may be implemented by software in addition to a general hardware platform. Based on such an understanding, the technical solutions of the present application essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments of the present application.

For same or similar parts in the embodiments in this specification, reference may be made to these embodiments. In particular, for the embodiment of the network-side device, because the embodiment of the network-side device is basically similar to the method embodiments, the embodiment of the network-side device is described in a relatively simple manner, and refer to descriptions of the method embodiments for related parts.

The foregoing descriptions are implementation manners of the present application, but are not intended to limit the protection scope of the present application.

What is claimed is:

1. A transmission resource allocation method comprising:
   obtaining, by a network-side device in each of a plurality of transmission time intervals (TTIs) in a current period, a quantity of a plurality of user equipment (UE) scheduled by the network-side device in the current period; and
   allocating, by the network-side device based on the quantity, M transmission resources used to transmit hybrid automatic repeat request (HARQ) acknowledgement information, wherein M represents a numeric value in a range that includes the quantity.

2. The transmission resource allocation method according to claim 1, wherein the quantity of the plurality of UE is a total quantity of UE scheduled in the current period.

3. The transmission resource allocation method according to claim 1, wherein the quantity of the plurality of UE is an average quantity of UE scheduled in the plurality of TTIs in the current period.

4. The transmission resource allocation method according to claim 1, wherein each of the M transmission resources is a code channel resource for a physical uplink control channel (PUCCH) format 1b channel selection (CS) manner, or a resource block (RB) for PUCCH format 3.

5. The transmission resource allocation method according to claim 1, wherein the transmission resource allocation method further comprises:
   receiving, by the network-side device, the HARQ acknowledgement information by using the M transmission resources in a next period relative to the current period.

6. A network-side device comprising:
an obtaining unit, configured to obtain, in each of a plurality of transmission time intervals (TTIs) in a current period, a quantity of a plurality of user equipment (UE) scheduled by the network-side device in the current period; and
an allocation unit, configured to allocate, based on the quantity obtained by the obtaining unit, M transmission resources used to transmit hybrid automatic repeat request (HARQ) acknowledgement information, wherein M represents a numeric value in a range that includes the quantity.

7. The network-side device according to claim 6, wherein the quantity of the plurality of UE is a total quantity of UE scheduled in the current period.

8. The network-side device according to claim 6, wherein the quantity the plurality of UE is an average quantity of UE scheduled in the plurality of TTIs in the current period.

9. The network-side device according to claim 6, wherein each of the M transmission resources is a code channel resource for a physical uplink control channel (PUCCH) format 1b channel selection (CS) manner, or a resource block (RB) for PUCCH format 3.

10. The network-side device according to claim 6, wherein the network-side device further comprises a receiving unit, and
the receiving unit is configured to receive, in a next period relative to the current period, the HARQ acknowledgement information by using the M transmission resources allocated by the allocation unit.

11. A non-transitory computer-readable medium having instructions stored therein, which when executed by a processor, cause the processor to perform a transmission resource allocation method comprising:
obtaining, by a network-side device in each of a plurality of transmission time intervals (TTIs) in a current period, a quantity of a plurality of user equipment (UE) scheduled by the network-side device in the current period; and
allocating, by the network-side device based on the quantity, M transmission resources used to transmit hybrid automatic repeat request (HARQ) acknowledgement information, wherein M represents a numeric value in a range that includes the quantity.

12. The non-transitory computer-readable medium according to claim 11, wherein the quantity of the plurality of UE is a total quantity of UE scheduled in the current period.

13. The non-transitory computer-readable medium according to claim 11, wherein the quantity of the plurality of UE is an average quantity of UE scheduled in the plurality of TTIs in the current period.

14. The non-transitory computer-readable medium according to claim 11, wherein each of the M transmission resources is a code channel resource for a physical uplink control channel (PUCCH) format 1b channel selection (CS) manner, or a resource block (RB) for PUCCH format 3.

15. The non-transitory computer-readable medium according to claim 11, wherein the transmission resource allocation method further comprises:
receiving, by the network-side device, the HARQ acknowledgement information by using the M transmission resources in a next period relative to the current period.

* * * * *